United States Patent
Oberheide et al.

(10) Patent No.: US 9,992,194 B2
(45) Date of Patent: *Jun. 5, 2018

(54) SYSTEM AND METHOD OF NOTIFYING MOBILE DEVICES TO COMPLETE TRANSACTIONS

(71) Applicant: Duo Security, Inc., Ann Arbor, MI (US)

(72) Inventors: Jon Oberheide, Ann Arbor, MI (US); Douglas Song, Ann Arbor, MI (US); Adam Goodman, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/363,468

(22) Filed: Nov. 29, 2016

(65) Prior Publication Data

US 2017/0078280 A1 Mar. 16, 2017

Related U.S. Application Data

(63) Continuation of application No. 13/039,209, filed on Mar. 2, 2011, now Pat. No. 9,544,143.

(Continued)

(51) Int. Cl.
*H04L 29/06* (2006.01)
*H04L 9/32* (2006.01)
(Continued)

(52) U.S. Cl.
CPC ........ *H04L 63/0853* (2013.01); *G06F 21/305* (2013.01); *G06F 21/31* (2013.01); *G06F 21/32* (2013.01); *H04L 9/32* (2013.01); *H04L 9/321* (2013.01); *H04L 63/083* (2013.01); *H04W 12/06* (2013.01); *H04W 12/08* (2013.01)

(58) Field of Classification Search
CPC ..... H04L 63/0853; H04L 63/083; H04L 9/32; H04L 9/321; H04W 12/06; H04W 12/08; G06F 21/305; G06F 21/32
See application file for complete search history.

(56) References Cited

U.S. PATENT DOCUMENTS 5,838,792 A 11/1998 Ganesan
5,870,723 A 2/1999 Pare et al.
(Continued)

OTHER PUBLICATIONS

F. Aloul, S. Zahidi and W. El-Hajj, "Two factor authentication using mobile phones," 2009 IEEE/ACS International Conference on Computer Systems and Applications, Rabat, 2009, pp. 641-644.*

(Continued)

*Primary Examiner* — Kari Schmidt
(74) *Attorney, Agent, or Firm* — Jeffrey Schox; Padowithz Alce

(57) ABSTRACT

A method including registering an authority device for an account on an auth platform; receiving transaction request from an initiator to the auth platform; messaging the authority device with the transaction request; receiving an authority agent response from the authority device to the auth platform; if the authority agent response confirms the transaction, communicating a confirmed transaction to the initiator; and if the authority agent response denies the transaction, communicating a denied transaction to the initiator.

10 Claims, 5 Drawing Sheets

Related U.S. Application Data

(60) Provisional application No. 61/309,885, filed on Mar. 3, 2010.

(51) Int. Cl.
*G06F 21/30* (2013.01)
*H04W 12/06* (2009.01)
*G06F 21/31* (2013.01)
*H04W 12/08* (2009.01)
*G06F 21/32* (2013.01)

(56) References Cited

U.S. PATENT DOCUMENTS

| | | |
|---|---|---|
| 6,119,096 A | 9/2000 | Mann et al. |
| 6,209,091 B1 | 3/2001 | Sudia et al. |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 6,996,716 B1 | 2/2006 | Hsu |
| 7,080,077 B2 | 7/2006 | Ramamurthy, Sr. et al. |
| 7,096,354 B2 | 8/2006 | Wheeler et al. |
| 7,331,518 B2 | 2/2008 | Rable |
| 7,349,929 B2 | 3/2008 | Pfitzner |
| 7,386,720 B2 | 6/2008 | Sandhu et al. |
| 7,447,784 B2 | 11/2008 | Eun |
| 7,463,637 B2 | 12/2008 | Bou-Diab et al. |
| 7,496,662 B1 | 2/2009 | Roesch et al. |
| 7,526,792 B2 | 4/2009 | Ross |
| 7,562,382 B2 | 7/2009 | Hinton et al. |
| 7,574,733 B2 | 8/2009 | Woodhill |
| 7,603,547 B2 | 10/2009 | Patrick et al. |
| 7,610,390 B2 | 10/2009 | Yared et al. |
| 7,711,122 B2 | 5/2010 | Allen et al. |
| 7,721,328 B2 | 5/2010 | Boulos et al. |
| 7,793,110 B2 | 9/2010 | Durfee et al. |
| 7,831,682 B2 | 11/2010 | Certain et al. |
| 7,904,608 B2 | 3/2011 | Price |
| 7,953,979 B2 | 5/2011 | Bomeman et al. |
| 7,982,595 B2 | 7/2011 | Hanna et al. |
| 8,028,325 B2 | 9/2011 | Cahill |
| 8,028,329 B2 | 9/2011 | Whitcomb |
| 8,108,253 B2 | 1/2012 | Poon et al. |
| 8,136,148 B1 | 3/2012 | Chayanam et al. |
| 8,151,317 B2 | 4/2012 | Hinton et al. |
| 8,161,527 B2 | 4/2012 | Curren |
| 8,196,177 B2 | 6/2012 | Hinton |
| 8,200,980 B1 | 6/2012 | Robinson et al. |
| 8,245,044 B2 | 8/2012 | Kang |
| 8,275,672 B1 | 9/2012 | Nguyen et al. |
| 8,280,979 B2 | 10/2012 | Kunz et al. |
| 8,332,627 B1 | 12/2012 | Matthews et al. |
| 8,335,933 B2 | 12/2012 | Humphrey et al. |
| 8,397,301 B2 | 3/2013 | Hering et al. |
| 8,402,508 B2 | 3/2013 | Rouskov et al. |
| 8,402,526 B2 | 3/2013 | Ahn |
| 8,458,335 B2 | 6/2013 | Holzer |
| 8,458,798 B2 | 6/2013 | Williams et al. |
| 8,468,609 B2 | 6/2013 | Leggette |
| 8,495,720 B2 | 7/2013 | Counterman |
| 8,499,339 B2 | 7/2013 | Chao et al. |
| 8,510,820 B2 | 8/2013 | Oberheide et al. |
| 8,538,028 B2 | 9/2013 | Yeap et al. |
| 8,539,567 B1 | 9/2013 | Logue et al. |
| 8,544,068 B2 | 9/2013 | Yates et al. |
| 8,549,601 B2 * | 10/2013 | Ganesan .......... G06F 21/42 726/8 |
| 8,595,809 B2 * | 11/2013 | Chayanam ........ G06F 21/34 713/183 |
| 8,627,438 B1 | 1/2014 | Bhimanaik |
| 8,635,679 B2 | 1/2014 | Hardt |
| 8,646,057 B2 | 2/2014 | Counterman |
| 8,646,060 B1 * | 2/2014 | Ben Ayed .......... H04L 63/0853 726/9 |
| 8,646,086 B2 | 2/2014 | Chakra et al. |
| 8,667,578 B2 | 3/2014 | Ladki et al. |
| 8,689,287 B2 | 4/2014 | Bohmer et al. |
| 8,700,729 B2 | 4/2014 | Dua |
| 8,707,409 B2 | 4/2014 | Shah et al. |
| 8,732,019 B2 | 5/2014 | Brown et al. |
| 8,732,475 B2 | 5/2014 | Fahrny et al. |
| 8,732,839 B2 | 5/2014 | Hohl |
| 8,745,703 B2 | 6/2014 | Lambert et al. |
| 8,763,077 B2 | 6/2014 | Oberheide et al. |
| 8,806,609 B2 | 8/2014 | Gladstone et al. |
| 2,639,997 A1 | 9/2014 | Wiesmaier et al. |
| 8,850,516 B1 | 9/2014 | Hrebicek et al. |
| 8,891,772 B2 | 11/2014 | D'Souza et al. |
| 8,893,230 B2 | 11/2014 | Oberheide et al. |
| 8,898,762 B2 | 11/2014 | Kang |
| 9,032,069 B2 | 5/2015 | Van Biljon et al. |
| 9,049,011 B1 | 6/2015 | Agrawal |
| 9,055,107 B2 | 6/2015 | Medvinsky et al. |
| 9,069,947 B2 | 6/2015 | Kottahachchi et al. |
| 9,209,978 B2 | 12/2015 | Besehanic |
| 9,223,961 B1 | 12/2015 | Sokolov |
| 9,270,663 B2 | 2/2016 | Kravitz et al. |
| 9,282,085 B2 | 3/2016 | Oberheide et al. |
| 9,361,468 B2 | 6/2016 | Peddada |
| 9,401,918 B2 | 7/2016 | Lu et al. |
| 9,418,213 B1 | 8/2016 | Roth et al. |
| 9,495,533 B2 | 11/2016 | Yiu et al. |
| 9,497,184 B2 | 11/2016 | Fork et al. |
| 9,607,142 B2 | 3/2017 | Dharmarajan et al. |
| 9,736,153 B2 | 8/2017 | McDaniel et al. |
| 2002/0123967 A1 | 9/2002 | Wang |
| 2002/0131404 A1 | 9/2002 | Mehta et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2004/0064706 A1 | 4/2004 | Lin et al. |
| 2004/0139318 A1 | 7/2004 | Fiala et al. |
| 2004/0218763 A1 | 11/2004 | Rose et al. |
| 2005/0097352 A1 | 5/2005 | Patrick et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2006/0021018 A1 | 1/2006 | Hinton et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184788 A1 | 8/2006 | Sandhu et al. |
| 2006/0242692 A1 | 10/2006 | Thione et al. |
| 2007/0016948 A1 | 1/2007 | Dubrovsky et al. |
| 2007/0081667 A1 | 4/2007 | Hwang |
| 2007/0101145 A1 | 5/2007 | Sachdeva et al. |
| 2007/0199060 A1 | 8/2007 | Touboul |
| 2007/0228148 A1 | 10/2007 | Rable |
| 2007/0250914 A1 | 10/2007 | Fazal |
| 2007/0254631 A1 | 11/2007 | Spooner |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0049642 A1 | 2/2008 | Gudipudi et al. |
| 2008/0069347 A1 | 3/2008 | Brown et al. |
| 2008/0120411 A1 | 5/2008 | Eberle |
| 2008/0229104 A1 | 9/2008 | Ju et al. |
| 2008/0301669 A1 | 12/2008 | Rao et al. |
| 2009/0055906 A1 | 2/2009 | Wendorff |
| 2009/0077060 A1 | 3/2009 | Sermersheim et al. |
| 2009/0083225 A1 | 3/2009 | Jacobs et al. |
| 2009/0167489 A1 | 7/2009 | Nan et al. |
| 2009/0187986 A1 | 7/2009 | Ozeki |
| 2009/0210705 A1 | 8/2009 | Chen |
| 2009/0259848 A1 * | 10/2009 | Williams .......... H04L 63/0838 713/168 |
| 2009/0300596 A1 | 12/2009 | Tyhurst et al. |
| 2009/0300707 A1 | 12/2009 | Garimella et al. |
| 2010/0023781 A1 | 1/2010 | Nakamoto |

(56) References Cited

U.S. PATENT DOCUMENTS

| | | |
|---|---|---|
| 2010/0042954 A1 | 2/2010 | Rosenblatt et al. |
| 2010/0069104 A1 | 3/2010 | Neil et al. |
| 2010/0107225 A1 | 4/2010 | Spencer et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0131755 A1 | 5/2010 | Zhu et al. |
| 2010/0180001 A1 | 7/2010 | Hardt |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0319068 A1 | 12/2010 | Abbadessa et al. |
| 2010/0330969 A1 | 12/2010 | Kim et al. |
| 2011/0026716 A1 | 2/2011 | Tang et al. |
| 2011/0086616 A1 | 4/2011 | Brand et al. |
| 2011/0107389 A1 | 5/2011 | Chakarapani |
| 2011/0119765 A1 | 5/2011 | Hering et al. |
| 2011/0138469 A1 | 6/2011 | Ye et al. |
| 2011/0197267 A1 | 8/2011 | Gravel et al. |
| 2011/0219449 A1 | 9/2011 | St Neitzel et al. |
| 2011/0277025 A1 | 11/2011 | Counterman |
| 2011/0302410 A1 | 12/2011 | Clarke et al. |
| 2011/0302630 A1 | 12/2011 | Nair et al. |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0278454 A1 | 11/2012 | Stewart et al. |
| 2012/0290841 A1 | 11/2012 | Jentzsch |
| 2012/0300931 A1 | 11/2012 | Ollikainen et al. |
| 2013/0042002 A1 | 2/2013 | Cheeniyil et al. |
| 2013/0060708 A1 | 3/2013 | Oskolkov et al. |
| 2013/0081101 A1 | 3/2013 | Baer et al. |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0310006 A1 | 11/2013 | Chen et al. |
| 2013/0326224 A1 | 12/2013 | Yavuz |
| 2013/0326493 A1 | 12/2013 | Poonamalli et al. |
| 2014/0047546 A1 | 2/2014 | Sidagni |
| 2014/0188796 A1 | 7/2014 | Fushman et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0351954 A1 | 11/2014 | Brownell et al. |
| 2015/0012914 A1 | 1/2015 | Klein et al. |
| 2015/0026461 A1 | 1/2015 | Devi |
| 2015/0242643 A1 | 8/2015 | Hankins et al. |
| 2016/0286391 A1 | 9/2016 | Khan |
| 2016/0366589 A1* | 12/2016 | Jean ................... H04L 63/083 |

OTHER PUBLICATIONS

Kher, Vishal, and Yongdae Kim. "Securing distributed storage: challenges, techniques, and systems." Proceedings of the 2005 ACM workshop on Storage security and survivability. ACM, 2005, pp. 9-25.*

Bonneau, Joseph, et al. "Passwords and the evolution of imperfect authentication." Communications of the ACM 58.7 (2015): 78-87.*

Edge, Kenneth, et al. "The use of attack and protection trees to analyze security for an online banking system." System Sciences, 2007. HICSS 2007. 40th Annual Hawaii International Conference on. IEEE, 2007.

Goldfeder et al., Securing Bitcoin wallets via a new DSA/ECDSA threshold signature scheme, http://www.cs.princeton.edu/~stevenag/threshold_sigs.pdf.

Nieuenhofen, Kay, and Mathew Thompson. "A secure marketplace for mobile Java agents." Proceeding of the second international Conference on Autonomous agents. ACM, 1998. (pp. 212-218).

Simske et al., "APEX: Automated Policy Enforcement eXchange", Sep. 21-24, 2010, ACM, pp. 139-142.

Symantec, Administration guide for symantec Endpoint protection and symantec network access control, 2009, version 11.00.05.00.00.

Symantec, Administration Guide for Symantec TM Endpoint Protection and Symantec Network Access Control, Aug. 1, 2007.

* cited by examiner

SYSTEM AND METHOD OF NOTIFYING MOBILE DEVICES TO COMPLETE TRANSACTIONS

CROSS-REFERENCE TO RELATED APPLICATIONS

This application is a continuation of U.S. application Ser. No. 13/039,209, filed 2 Mar. 2011 which claims the benefit of U.S. Provisional Application No. 61/309,885, filed 3 Mar. 2010, both of which are incorporated in their entireties by this reference.

TECHNICAL FIELD

This invention relates generally to the digital security services field, and more specifically to a new and useful system and method of notifying mobile devices to complete transactions in the digital security field.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). However, many of these solutions are burdensome to users, requiring the user to remember information or carry extra devices to complete a transaction. Thus, there is a need in the digital security services field to create a new and useful system and method of notifying mobile devices to complete transactions. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
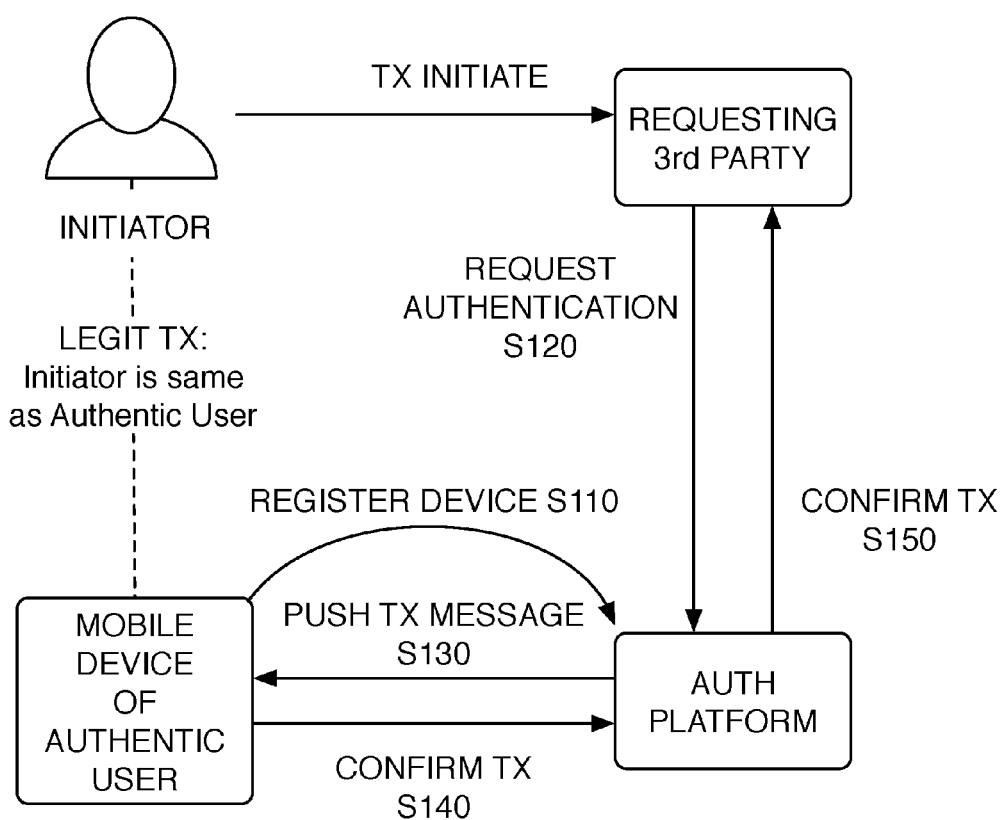
FIGS. 1 and 2 are schematic representations of a method of a preferred embodiment for authenticating a transaction.
Figure 2:
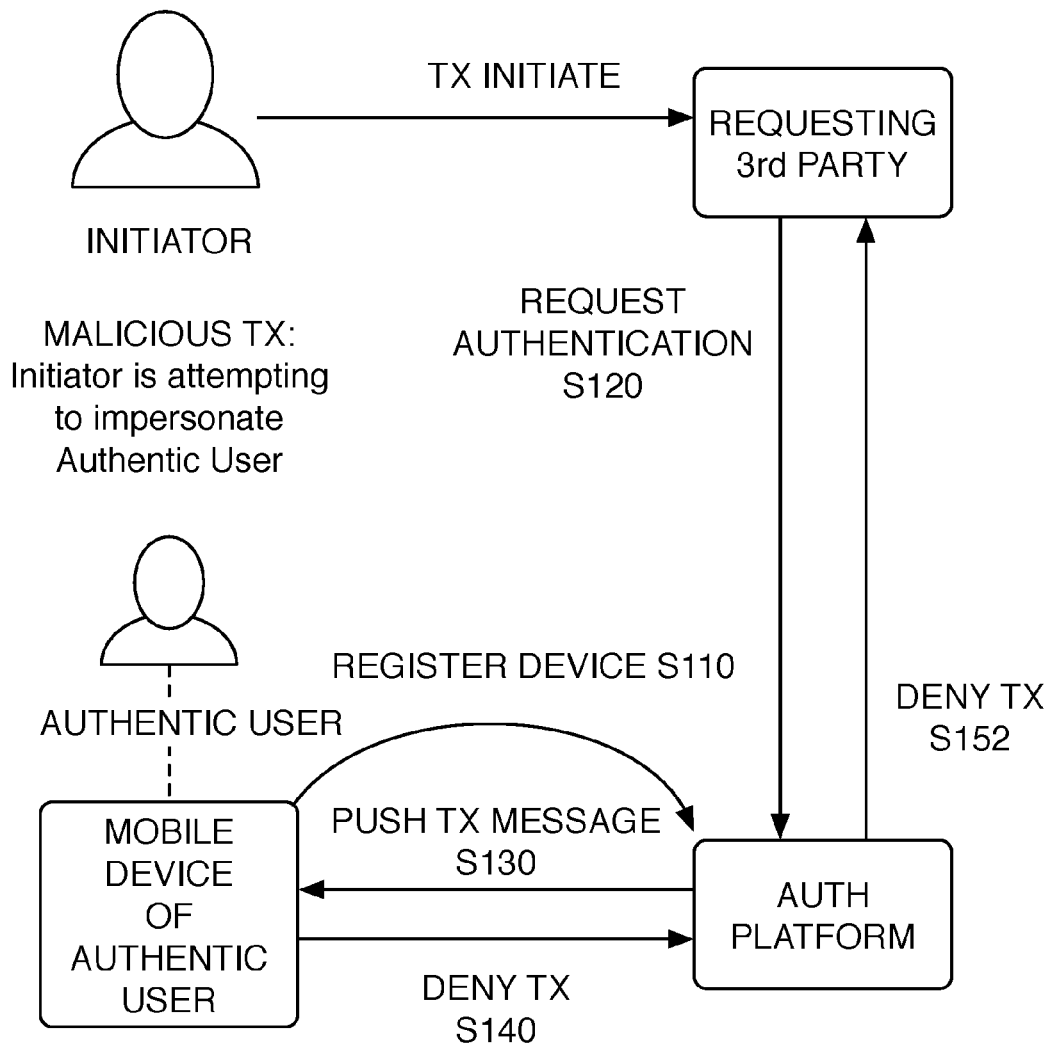
Figure 3:
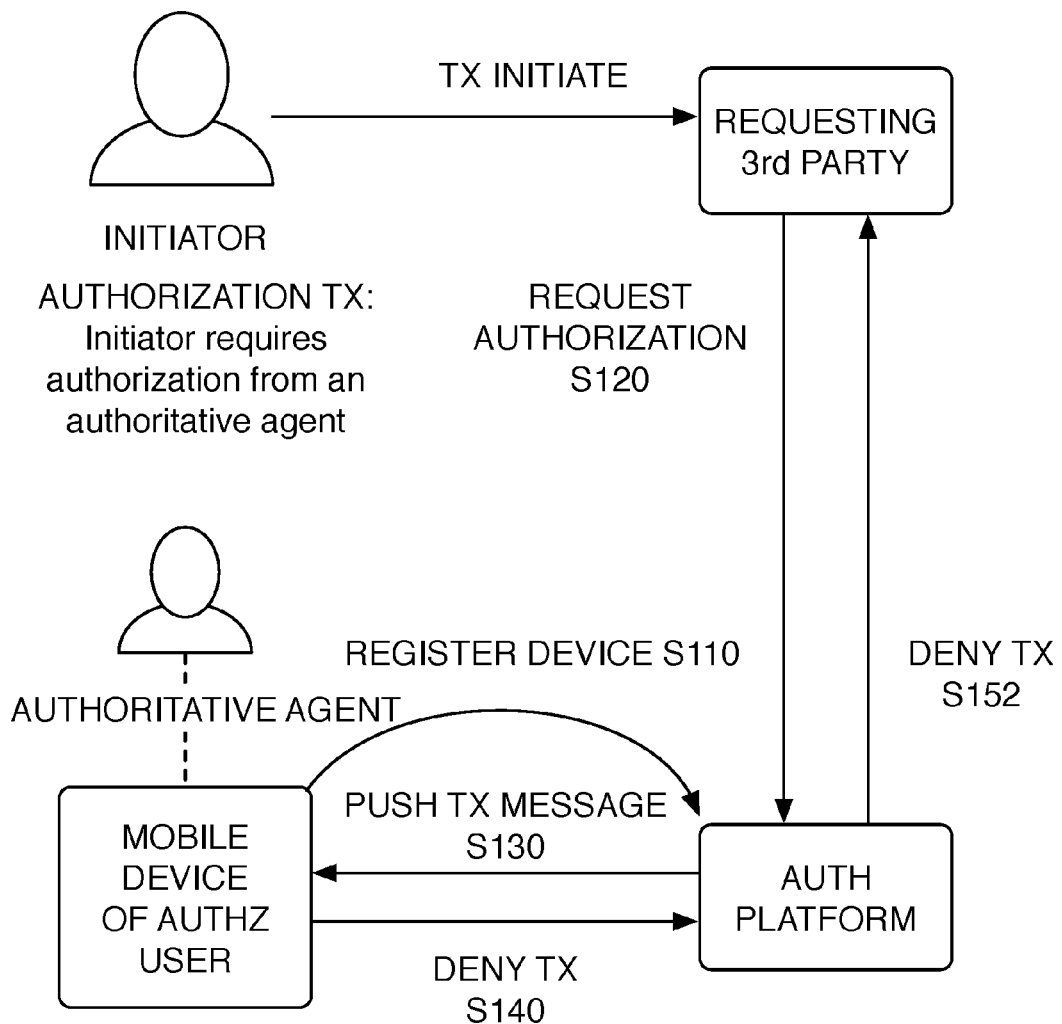
FIG. 3 is a schematic representation of a method of a preferred embodiment for authorizing a transaction.

As shown in FIGS. 1-3, the method of the preferred embodiments for notifying mobile devices to complete transactions includes registering an authority device for an account on an auth platform S110, receiving a transaction request from an initiator to the auth platform S120, messaging the authority device with the transaction request S130, receiving an authority agent response from the authority device to the auth platform S140, if the authority agent response confirms the transaction, communicating a confirmed transaction to the initiator S150, and if the authority agent response denies the transaction, communicating a denied transaction to the initiator S152. The method functions to use push-based challenges on mobile device for the authentication and/or authorization of parties involved in a transaction. The method functions to utilize non-intrusive techniques while providing improved security. The pushed messages preferably alert a user to the transaction request in real-time such that a decision of confirmation or denial of a transaction can be communicated to a requesting party with minimal time lag (e.g., preferably less than a minute, and more preferably less than 10 seconds). The method may be employed as standalone transaction validation or incorporated into a multifactor system. The method may be used in application such as web-based applications, remote access credentials, privileged account management, financial transactions, password recovery/reset mechanisms, physical access control, Automatic Teller Machine (ATM) withdrawals, domain name transfers, online or offline transactions, building access security, or any suitable application requiring authentication and/or authorization.

The method is preferably performed by an auth platform that communicates with a client of an initiating agent and an authority device associated with an account of the auth platform. The auth platform is preferably an internet accessible server that may be hosted on a distributed computing system, but may be hosted on any suitable platform. The initiating agent is typically a user or process that initiates a transaction. The requested transaction is preferably initiated by the initiating agent through a client such as a website, application, or device (e.g., an ATM machine). For authentication, the initiator agent may be a legitimate party or a malicious party attempting to fraudulently impersonate the legitimate party. For authorization, the initiating agent may be a legitimate authenticated party but may require approval from other parties to perform the action of the transaction. The authority device is preferably a device associated with an authentic agent that is a user or process that is legitimately authenticated or authorized to execute transactions. Even if a malicious entity were attempting to impersonate a user or authentic agent through stolen credentials or other means, they would—ideally—lack the authority device to complete a transaction.

Figure 4:
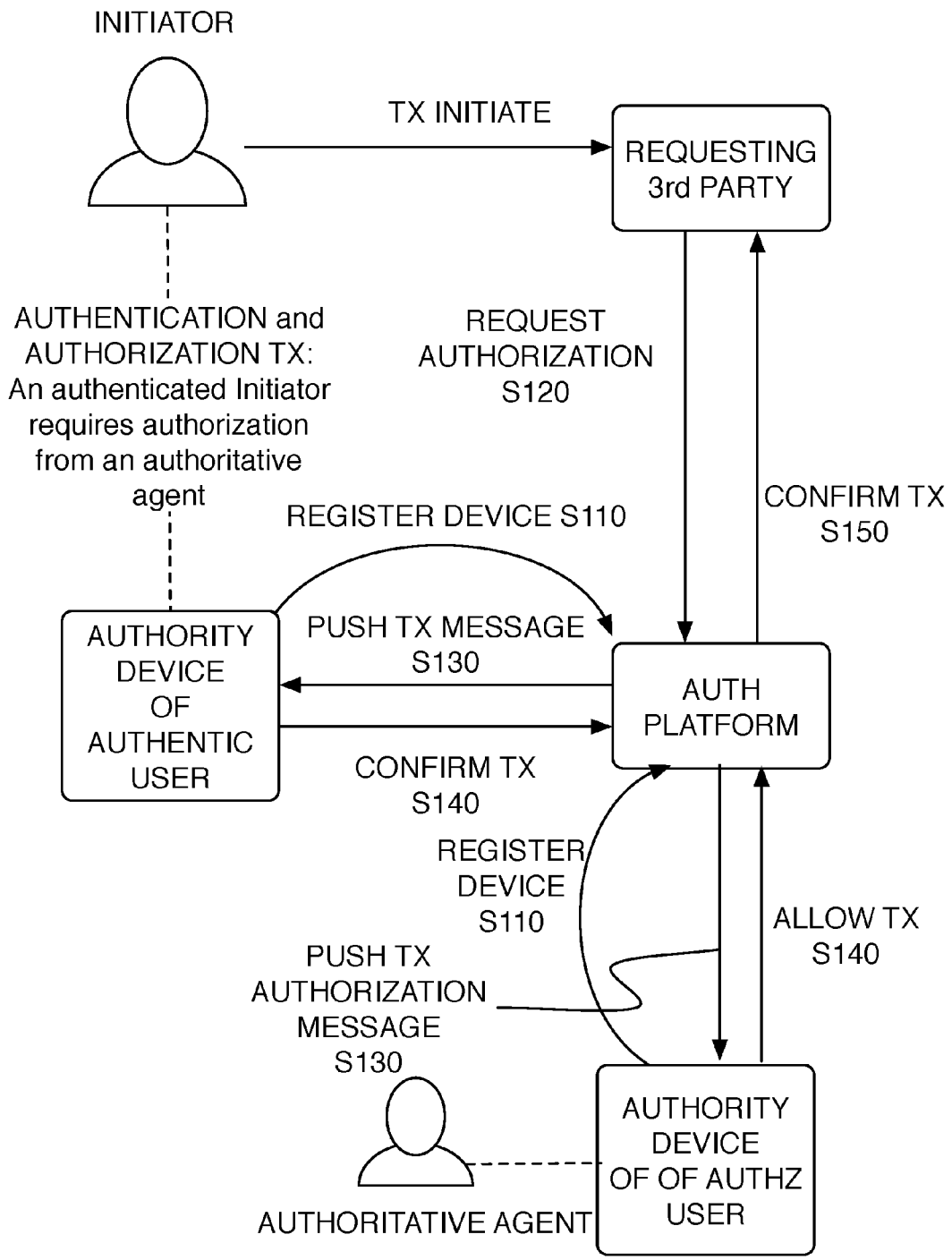
FIG. 4 is a schematic representation of a method of a preferred embodiment for authenticating and authorizing a transaction.
Figure 5:
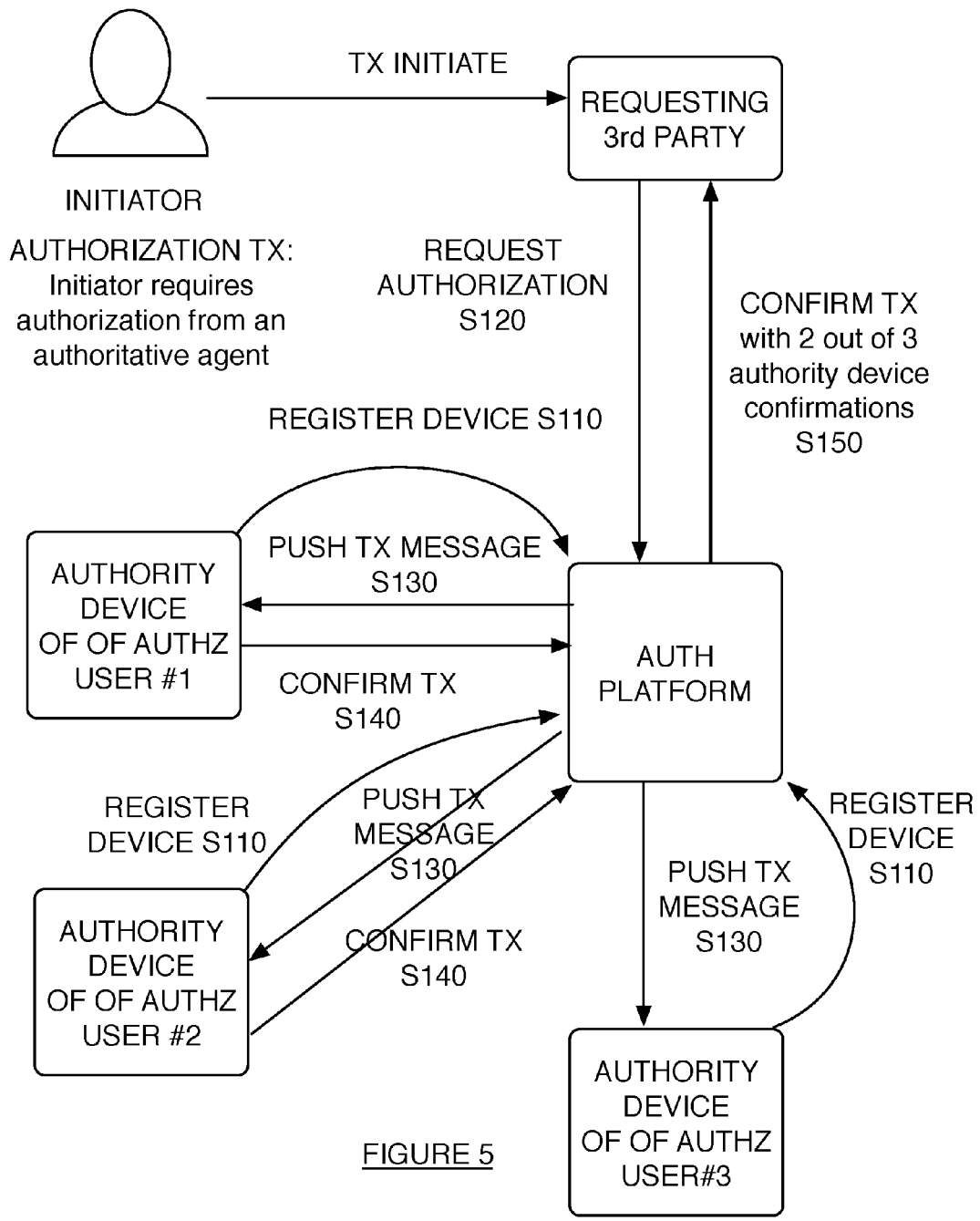
FIG. 5 is a schematic representation of a method of a preferred embodiment with a plurality of authority devices.

Step S110, which includes registering an authority device for an account on an auth platform, functions to identify a device of an agent that is permitted to authenticate or authorize transactions. The registration preferably occurs prior to a transaction request, and is preferably performed during an initial setup of an account on the auth platform. During the setup authentication and/or authorization rules are preferably set. The authority device is preferably a mobile computing device possessed by an authentic user or an authorized agent. The mobile device is preferably a mobile phone, tablet computer, smartphone, personal data assistant (PDA), personal computer, and/or any suitable computing device. The authority device preferably has access to a network over which communication with the auth platform is performed, such as a WiFi network, local-area network, telephony network, short message service (SMS) network, multimedia messaging service (MMS), or any suitable network. A plurality of devices may additionally be registered, as shown in FIG. 5. A second authority device may provide a backup communication point if a primary authority device does not respond. For example, after attempting to contact a primary authority device, the auth platform may message a secondary authority device for authentication or authorization. Or, alternatively, a threshold of two confirmations may need to be received to authorize a transaction. Additionally, a first authority device may be registered for authenticating the identity of an agent of the transaction request, and a second authority device may be registered for authorizing an action of an agent such that authentication and authorization may both be enabled, as shown in FIG. 4.

Step S120, which includes receiving a transaction request from an initiator to the auth platform, functions to initiate a transaction. The transaction is preferably any event, transfer, action, or activity that requires authentication and/or authorization of an involved party. Exemplary transactions may include logging into a website, application or computer system; a user withdrawing money from an ATM; a user initiating a "forgotten password" procedure; a user attempting to enter a restricted area of a building or environment; a payment exchange between two entities; a user attempting to perform a restricted action in a computer system; and/or any suitable application requiring authentication and/or authorization. Authentication preferably includes validating the identity of at least one involved party relevant to a transaction. Authorization preferably includes validating authority or permission of an entity to execute a transaction. For authentication, the authority device preferably belongs to the authentic user for self-approval of transactions. For authorization, the authority device preferably belongs to an authoritative user that is preferably in charge of regulating transactions of a user involved in the transaction. The transactions are preferably initiated in an online environment, where parties may be communicating using a computing device or public/private network, but the transactions may alternatively occur offline where parties may be interacting in the real world. The user or device initiating the transaction is ideally a legitimate party, as shown in FIG. 1, but in the situations where a malicious party initiates or participates in the transaction, the method is preferably able to properly identify such a situation, as shown in FIG. 2. After a malicious transaction is prevented the approval rules for a transaction may be dynamically altered to increase security. The transaction is preferably sent from a requesting entity such as a website, application, or device. The requesting entity is typically a system in communication with the auth platform. An application programming interface (API) or any suitable protocol is preferably used to communicate between the requesting entity and the auth platform. In one variation, the communication sent from the requester is encrypted and the authority device preferably decrypts the information. This variation preferably prevents the auth platform from inspecting or accessing the communicated information which may be applicable when a third party is passing sensitive information through the auth platform. As an alternative variation, the communication between the requester and the auth platform is preferably encrypted or otherwise cryptographically protected and communication between the auth platform and the authority device verifies that the communication is from the authority device. Any suitable steps may be taken to secure the communication between the requesting entity, the auth platform and the authority device.

Step S130, which includes messaging the authority device with the transaction request, functions to push a notification to a secondary device for authentication or authorization. The authority device is preferably a device only the authentic user or an authorized user would possess. The message is preferably sent through a communication channel between the authority device and the auth platform. The communication channel is preferably a push notification service provided through the authority device. The communication channel may alternatively be a short message system SMS network, email, a instant message, an in-app notification system, web based websocket or publication-subscription channels, image based transmission of transaction information such as through QR-codes captured by a camera, or any suitable technique for messaging the device. The messages preferably appear on the authority device or create an alert in substantially real-time (e.g., in less than 5 minutes). The realtime aspect of the messaging functions to enable authentication and authorization at the time of the transaction. In one variation, tracking a registered authority device may additionally be performed by the auth platform. For example, in a persistent TCP/IP connection model, a mobile device moving from a service provider data network to a WiFi network may change IP addresses and therefore initiate a new persistent connection. Upon receiving that new connection and an identifier of the mobile device, the auth platform preferably updates the state of the device for the account associated with that device. Then, the proper connection is preferably used for messaging the authority device. Some communication channels may have limited throughput and lack the capability to present a full message from the auth platform. For example, SMS messages have a 160 character limit. An initial message may include a unique identifier, which can then be used to retrieve a full message. For example, the SMS message may include a URL link or code which can be used to retrieve a full message from an application or website. The full message may provide additional information and options for a transaction response. The messages transmitted over the communication channel may additionally be cryptographically signed and encrypted using an established setup between the auth device and the auth platform. Additionally the messages preferably include transaction information (i.e., metadata). The transaction information may include account or entity name, transaction details, location and time of transaction, IP address of initiating host, geolocation of the IP address or any suitable information or any suitable data on the transaction. In one example an online bank transfer may have a message with transaction information including payer, payee, account numbers, transfer amount, and transaction date and time.

Step S140, which includes receiving an authority agent response from the authority device to the auth platform, functions to process a response from an authentic user or authorized user. The response preferably confirms or denies a transaction. The confirmation and denial of a transaction may additionally be set to indicate any suitable form of response. Preferably, the initial options are to accept or reject a transaction. Additionally, if a transaction is rejected a reason for rejection may be included such as "canceled because of change of mind" or "possible malevolent transaction". Other variations may include a variety of options that may change based on the application. The available forms of responses may be included in the message information. Other forms of responses may allow a variety of multiple-choice options, variable setting options, or any suitable form of response input. For example, if a parent is acting as an authorization provider for an ATM withdraws made by a child, a message may be sent to a phone of the parent indicating that the child is attempting to withdraw a particular amount (e.g., $50). The parent may be able to respond allowing a withdrawal of only a lower amount (e.g., $20). As an additional sub-step to receiving an authority agent response, the response is preferably verified to be a legitimate response from the authority device as opposed to an entity imitating the device. Secure Socket Layer (SSL), a Hash-based Message Authentication Code (HMAC), message signing, or any suitable cryptographic protocol may be used to verify the response is from the authority device.

Step S150 and S152, which includes if the authority agent response confirms the transaction, communicating a confirmed transaction to the initiator, and if the authority agent response denies the transaction, communicating a denied transaction to the initiator, function to communicate the authentication and/or authorization to the initiator of the transaction. Any suitable response to a transaction is preferably communicated back to the requesting entity (e.g., a third party website or an ATM machine). The requesting entity can then preferably take appropriate action. If the transaction is confirmed or approved, the transaction proceeds. If the transaction is denied or altered, the requesting entity preferably halts or prevents the transaction. The requesting entity can preferably use the transaction response to modify a transaction state in any suitable manner. Based on the variety of responses from authentic users and/or authorized users, rules may determine when to confirm or deny a transaction. In a variation of the method, there may be a plurality of authority devices registered for authorization and/or authentication. A rule may be setup for which authority devices to message, in what order, and the timing of the messaging. Additionally, rules may be set for received responses. A particular threshold for the number of responses from the plurality of authority devices may be set. For example, four authority devices may be messaged for authorization and at least three must confirm the transaction for it to be confirmed. In another example, a plurality of authority devices for authentication may be registered, and the authority devices are messaged one after the other until at least one responds. The response from an authority agent may alternatively be passed on to the requesting entity with no analysis.

An alternative embodiment preferably implements the above methods in a computer-readable medium storing computer-readable instructions. The instructions are preferably executed by computer-executable components preferably integrated with an auth platform. The auth platform is preferably hosted on a distributed computing system or cloud based platform but may alternatively be hosted in any suitable system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The auth platform preferably includes an API for third party services and devices to use in initiating transactions and interpreting responses from the auth platform. The platform preferably includes a communication channel such as a public or private network or SMS network to communicate with at least one authority device. The authority device is preferably a mobile phone but may be any suitable personal computing device.

As a person skilled in the art will recognize from the previous detailed description and from the figures and claims, modifications and changes can be made to the preferred embodiments of the invention without departing from the scope of this invention defined in the following claims.

We claim:

1. A method of completing a transaction comprising the steps of:

registering a user authentication device of an authentic user on a remote auth platform comprising a web server;

registering a user authoritative device of an authoritative agent on the remote auth platform;

setting a transaction confirmation threshold requiring a confirmation response from the user authentication device of the authentic user and an authorization response from the user authoritative device of the authoritative agent to enable a completion of a transaction request;

receiving, at a user interface having Internet accessibility, user login input from a user for initiating the transaction request, wherein the user login input comprises user authentication credentials for performing an initial authentication of the user at the user interface, and wherein the user interface is maintained by a first entity;

identifying whether the user comprises the authentic user for the transaction request based on the user login input comprising the user authentication credentials received at the user interface;

in response to identifying the user as authenticated based on the user login input, transmitting by the user interface via an application programming interface (API) the transaction request to the remote auth platform that is separate and independent from the user interface and that performs at least a second authentication of the user, wherein the remote auth platform is maintained by a second entity;

separately, at the remote auth platform, performing the second authentication of the user by performing the steps of:

(i) using the transaction request to identify the user authentication device of the authentic user registered at the remote auth platform;

(ii) using the transaction request to identify the user authoritative device of the authoritative agent that is registered at the remote auth platform;

(iii) transmitting via a secure push-based communication channel a first push-based challenge to the user authentication device, the first push-based challenge comprising a message including details of the transaction request and a request to confirm or deny the transaction request by submitting one of a user input at the user authentication device to confirm the transaction request or a user input at the user authentication device to deny the transaction request;

(iv) receiving from the user authentication device, via the secure push-based communication channel, a response to the push-based challenge comprising the user input to confirm the transaction request or the user input to deny the transaction request;

(v) transmitting via a second secure push-based communication channel a second push-based challenge to the user authoritative device, the second push-based challenge comprising a message including details of the transaction request and a request to authorize or deny authorization of the transaction request of the authentic user by submitting one of an authoritative user input at the user authoritative device to authorize the transaction request or an authoritative user input at the user authoritative device to deny authorization of the transaction request;

(vi) processing the responses to the first push-based challenge and the second push-based challenge to determine whether the second authentication of the authenticated-user is successful and the transaction request is authorized; and when the responses to the first push-based challenge confirms the transaction request and the response to the second push-based challenge authorizes the transaction request thereby satisfying the transaction confirmation threshold, transmitting, via the API, from the remote auth platform an attestation to the first entity that the authentic user of the authentication device confirmed the transaction request, or when the response to the first push-based challenge does not confirm the transaction request or when the response to the second push-based challenge denies authorization of the transaction request thereby not satisfying the transaction confirmation threshold, transmitting, via the API, from the remote auth platform an attestation to the first entity that the authentic user of the authentication device or the authoritative user of the authoritative device denied the transaction request.

2. The method of claim 1, wherein when:

both (a) the user is identified as being an authenticated user and (b) the second authentication of the authenticated user of the transaction request based on the response to the first push-based challenge comprises the user input to confirm the transaction request, completing the transaction request at the user interface, or (a) the user is identified as being the authenticated user and (b) the second authentication of the authenticated user of the transaction request based on the response to the first push-based challenge comprises the user input to deny the transaction request, denying the transaction request.

3. The method of claim 1, wherein the first entity maintaining the user interface and transmitting the transaction request to the remote auth platform is different from the second entity comprising a second authentication entity that maintains the remote auth platform.

4. The method of claim 3, wherein the second authentication entity only performs the second authentication of the authenticated user and does not identify the user as being the authenticated user.

5. The method of claim 3, wherein the user authentication device comprises a remote user authentication device that is not maintained by none of the first entity transmitting the transaction request and the second authentication entity.

6. The method of claim 1, wherein the attestation to the user interface is transmitted in real-time, wherein the transmission of the attestation to the user interface occurs and is received by the user interface at a time of the transaction.

7. The method of claim 1, wherein the remote auth platform comprises the web server hosted on a distributed computing system.

8. The method of claim 1, wherein the user interface and the user authentication device are separate and distinct.

9. The method of claim 1, wherein a plurality of user authentication devices are registered at the remote auth platform, and communicating to the user authentication device includes messaging at least two of the plurality of user authentication devices.

10. A system for facilitating a transaction involving a first authentication and a second authentication, the system comprising:

a user authentication device an authentic user that is registered on a remote auth platform, the remote auth platform comprising a server;

a user authoritative device of an authoritative agent that is registered on the remote auth platform, wherein a transaction confirmation threshold is set that requires a confirmation response from the user authentication device of the authentic user and an authorization response from the user authoritative device of the authoritative agent to enable a completion of a transaction request;

a remote user interface, wherein the transaction request is initiated by a user, wherein the first authentication of the user is performed at the remote user interface based on receipt of user login input, wherein the remote user interface is maintained by a first entity, wherein in response to authenticating the user at the remote user interface, transmitting by the user interface, via an application programming interface, the transaction request to the remote auth platform, wherein the remote auth platform is maintained by a second entity different from the first entity;

wherein the remote auth platform performs the secondary authentications of the user, wherein performing the secondary authentication of the user includes the steps of:

(i) using the transaction request to identify the user authentication device of the authentic user registered at the remote auth platform;

(ii) using the transaction request to identify the user authoritative device of the authoritative agent that is registered at the remote auth platform;

(iii) transmitting via a secure push-based communication channel a first push-based challenge to the user authentication device, the first push-based challenge comprising a message including details of the transaction request and a request to confirm or deny the transaction request by submitting one of a user input at the user authentication device to confirm the transaction request or a user input at the user authentication device to deny the transaction request;

(iv) receiving from the user authentication device, via the secure push-based communication channel, a response to the push-based challenge comprising the user input to confirm the transaction request or the user input to deny the transaction request;

(v) transmitting via a second secure push-based communication channel a second push-based challenge to the user authoritative device, the second push-based challenge comprising a message including details of the transaction request and a request to authorize or deny authorization of the transaction request of the authentic user by submitting one of an authoritative user input at the user authoritative device to authorize the transaction request or an authoritative user input at the user authoritative device to deny authorization of the transaction request;

(vi) processing the response to the first push-based challenge and the second push-based challenge to determine whether the second authentication of the user is successful and the transaction request is authorized; and when the responses to the first push-based challenge confirms the transaction request and the response to the second push-based challenge authorizes the transaction request thereby satisfying the transaction confirmation threshold, transmitting, via the API, from the remote auth platform an attestation to the first entity that the authentic user of the authentication device confirmed the transaction request, or when the response to the first push-based challenge does not confirm the transaction request or when the response to the second push-based challenge denies authorization of the transaction request thereby not satisfying the transaction confirmation threshold, transmitting, via the API, from the remote auth platform an attestation to the first entity that the authentic user of the authentication device or the authoritative user of the authoritative device denied the transaction request.

* * * * *